US008714351B2

(12) United States Patent
Toulotte

(10) Patent No.: US 8,714,351 B2
(45) Date of Patent: May 6, 2014

(54) COVER FOR TABLET COMPUTER

(71) Applicant: Graphique de France, Ltd., Woburn, MA (US)

(72) Inventor: Jean-Jacques Toulotte, Woburn, MA (US)

(73) Assignee: Graphique de France, Ltd., Woburn, MA (US)

( * ) Notice: Subject to any disclaimer, the term of this patent is extended or adjusted under 35 U.S.C. 154(b) by 0 days.

(21) Appl. No.: 13/866,204

(22) Filed: Apr. 19, 2013

(65) Prior Publication Data

US 2013/0277271 A1    Oct. 24, 2013

Related U.S. Application Data

(60) Provisional application No. 61/635,517, filed on Apr. 19, 2012.

(51) Int. Cl.
*B65D 85/00*    (2006.01)

(52) U.S. Cl.
USPC ............... 206/320; 206/45.23; 206/45.24; 206/759; 206/762; 248/136

(58) Field of Classification Search
CPC ..... A45C 2011/001–2011/003; A45C 2200/15
USPC .......... 206/320, 45.2, 45.21–45.25, 752, 759, 206/756, 424, 576, 760, 762; 248/135, 174; 40/750; 361/679.56, 3, 15, 16, 12, 9
See application file for complete search history.

(56) References Cited

U.S. PATENT DOCUMENTS

| 1,912,735 | A  | * | 6/1933  | Stein ........................... 281/42 |
| 5,887,723 | A  | * | 3/1999  | Myles et al. ................ 206/760 |
| 6,829,140 | B2 | * | 12/2004 | Shimano et al. ......... 361/679.09 |
| 7,561,415 | B2 | * | 7/2009  | Liou et al. .............. 361/679.26 |
| 8,230,992 | B2 | * | 7/2012  | Law et al. .................... 206/320 |
| 8,281,924 | B2 | * | 10/2012 | Westrup ...................... 206/320 |
| 8,459,453 | B2 | * | 6/2013  | Parker et al. ................ 206/320 |
| 8,477,493 | B2 | * | 7/2013  | Wu et al. ................ 361/679.56 |
| 2004/0150628 | A1 |  | 8/2004  | Huang et al. ................ 345/173 |
| 2004/0240164 | A1 | * | 12/2004 | Lee ............................... 361/683 |
| 2008/0029412 | A1 | * | 2/2008  | Ho et al. ...................... 206/320 |

(Continued)

FOREIGN PATENT DOCUMENTS

| AU | 2010101318 A4 | 12/2010 | ............... A45C 3/02 |
| CN | 202058075 U   | 11/2011 | ............... G06F 1/18 |

(Continued)

*Primary Examiner* — Steven A. Reynolds
*Assistant Examiner* — Mollie Llewellyn
(74) *Attorney, Agent, or Firm* — Sunstein Kann Murphy & Timbers LLP

(57) ABSTRACT

A protective cover for a tablet computer includes a front board, a back board having a hinge, and a spine board. A cradle assembly affixed to a first portion of the back board releasably grips the tablet computer. A riser board is attached to the back of the cradle assembly. Attachment means removably attach the riser board to the back board to provide an adjustable angle between the cradle assembly and a second portion of the back board. The attachment means may be a mechanical stopper, a magnet, a clasp, a rivet, or an adhesive. The protective cover may include a wrapping that conceals the front board, the back board, and the spine board and that provides a pattern, a logo, or a pleasing image.

15 Claims, 12 Drawing Sheets

(56) References Cited

U.S. PATENT DOCUMENTS

| | | | |
|---|---|---|---|
| 2008/0237432 A1* | 10/2008 | Patterson | 248/458 |
| 2009/0178938 A1* | 7/2009 | Palmer | 206/45.23 |
| 2010/0006473 A1* | 1/2010 | Lebauer et al. | 206/759 |
| 2011/0284420 A1 | 11/2011 | Sajid | B65D 69/00 |
| 2011/0290687 A1* | 12/2011 | Han | 206/320 |
| 2011/0297564 A1* | 12/2011 | Kim et al. | 206/320 |
| 2012/0012483 A1* | 1/2012 | Fan | 206/320 |
| 2012/0037523 A1* | 2/2012 | Diebel et al. | 206/320 |
| 2012/0153116 A1* | 6/2012 | Harrison | 248/460 |
| 2012/0224323 A1* | 9/2012 | Yang | 361/679.55 |
| 2012/0307441 A1* | 12/2012 | Hung et al. | 361/679.09 |
| 2013/0134061 A1* | 5/2013 | Wu et al. | 206/320 |
| 2013/0170125 A1* | 7/2013 | Liang et al. | 361/679.09 |
| 2013/0175200 A1* | 7/2013 | Poon et al. | 206/759 |
| 2013/0213838 A1* | 8/2013 | Tsai et al. | 206/320 |
| 2013/0240382 A1* | 9/2013 | Ledesma | 206/45.24 |
| 2013/0242490 A1* | 9/2013 | Ku | 361/679.3 |

FOREIGN PATENT DOCUMENTS

| | | | |
|---|---|---|---|
| CN | 102411404 A | 4/2012 | G06F 1/16 |
| EP | 2 392 986 A2 | 7/2011 | G06F 1/16 |
| TW | M416789 U | 11/2011 | G06F 1/16 |
| WO | WO 2010/036090 A2 | 4/2010 | A45C 11/00 |
| WO | WO 2011/084181 A1 | 7/2011 | A45C 11/00 |

* cited by examiner

COVER FOR TABLET COMPUTER

CROSS-REFERENCE TO RELATED APPLICATION

This application claims the benefit of U.S. Provisional Application No. 61/635,517, filed Apr. 19, 2012, the contents of which are incorporated by reference in their entirety.

TECHNICAL FIELD

The present invention relates to portable electronic devices such as tablet computers, and more particularly to a cover that releasably grips a portable electronic device.

BACKGROUND ART

It is known in the prior art to protect tablet computers with covers. There are predominantly two different types of such covers: those that protect only the touch screen, and those that protect the entire body. With respect to the popular iPad tablet computer made by Apple Inc. of Cupertino, Calif., the Smart Cover, also made by Apple, is an example of the first type of cover. The Smart Cover is manufactured from four rigid sections and is magnetically attachable to the iPad. The four sections may be folded against each other to form a triangle that may be pivoted about the magnetic attachment to the rear of the iPad, so that the tablet computer may rest on the triangle at an angle that permits pleasant viewing. Depending on the orientation of the triangle and the computer, the view screen may be observed at either a slight angle or a nearly vertical angle with respect to the surface on which it is resting. However, the Smart Cover does not protect the iPad from damage due to impacts, and only one inclination angle with respect to the triangle is available.

There are also covers that protect the entire body. Such a cover may take the form, for example, of a portfolio that surrounds the computer like a book cover. Such portfolios may include a receptacle that holds the computer, and may be closed using a zipper, snaps, or other fasteners. While full-body covers may protect the tablet computer from impact damage, their bulky design generally does not permit them to be inclined for easy viewing without the assistance of an external stand, and such stand/cover combinations may be unstable with respect to their centers of gravity.

SUMMARY OF ILLUSTRATED EMBODIMENTS

Various embodiments of the present invention provide a protective cover for a tablet computer that combines the advantages of impact protection with the advantages of multiple angles of inclination and viewing, while remaining lightweight and not significantly more bulky than the tablet computer itself.

In a first embodiment of the invention there is provided a cover for a tablet computer. The cover includes a front board, a back board, a spine board, a cradle assembly, a riser board, and attachment means. The front board has an interior surface and an exterior surface. The back board also has an interior surface and an exterior surface. The back board includes a proximal section and a distal section, the two sections each having an interior and an exterior surface corresponding to the interior surface and exterior surface of the back board respectively. The two sections are hingedly attached to each other along a back board hinge axis.

The spine board is hingedly attached to the front board along a front-spine hinge axis and hingedly attached to the proximal section of the back board along a back-spine hinge axis. The front-spine hinge axis and the back-spine hinge axis are parallel to the back board hinge axis, so that in a closed configuration of the cover, the interior surface of the back board faces the interior surface of the front board, and in an open configuration the exterior surface of the back board faces the exterior surface of the front board.

The cradle assembly has a front and a back. The front of the cradle assembly is shaped to releasably grip the tablet computer and a distal portion of the back of the cradle assembly is affixed to the interior surface of the distal section of the back board.

The riser board has two relevant edges. The first edge of the riser board is hingedly attached to a proximal portion of the back of the cradle assembly along a riser-hinge axis that is parallel to the back board hinge axis. The attachment means are capable of removably attaching the second edge of the riser board to the proximal section of the back board. Thus, when the second edge is thus attached, the cradle assembly is maintained at a positive acute angle relative to the proximal section of the back board. Moreover, when the second edge is not thus attached, the riser board may be rotated about the riser hinge axis to a position adjacent the back of the cradle assembly, thereby permitting the cover to assume the closed configuration.

The front board, the back board, the spine board, and the riser board may be paperboard or foam. Each hinge attachment may be made from paper. The cradle assembly may be made from injection-molded plastic. The distal section of the back board may have a width that is approximately two-thirds of a width of the proximal section of the back board. The cover may also include a stopper attached to the interior surface of the proximal section of the back board near the spine-back hinge axis.

In a related embodiment, the cover includes a metallic track affixed to the interior surface of the proximal section of the back board. In this embodiment, the attachment means comprises a rigid flap hingedly attached to the second edge of the riser board upon which is affixed a magnet, so that when the magnet is aligned with the metallic track, a magnetic attraction is produced that is sufficient to resist relative movement between the rigid flap and the proximal section of the back board. Using this embodiment, the positive acute angle of the cradle assembly relative to the proximal section of the back board is adjustable by moving the magnet along the metallic track, so that the angle is decreased by moving the magnet farther from the spine and the angle is increased by moving the magnet closer to the spine. The embodiment may also include a mechanical stop attached to the interior surface of the proximal section of the back board near the spine-back hinge axis, wherein when the second edge of the riser board is in contact with the mechanical stop, the magnet is aligned with the metallic track.

Generally speaking, the attachment means may include a mechanical stopper, a magnet, a clasp, a rivet, or an adhesive. The cover may have a first magnet having a first polarity, that is affixed to the exterior surface of the front board, and a second magnet having a polarity opposite to the first polarity, that is affixed to the exterior surface of the back board, so that when the cover is in the open configuration, the first magnet and the second magnet are aligned to produce a magnetic attraction that is sufficient to resist relative movement between the front board and the back board. The cover may have a magnet that is affixed to the interior surface of the front board, so that when the cover is closed, the magnet aligns with a sensor of the tablet computer, thereby activating the sensor.

In another related embodiment, the cover may have a wrapping that conceals the front board, the back board, and the spine board. The wrapping may be suede, velvet, or cloth. Moreover, an exterior surface of the wrapping may be decorated with a pattern, a logo, or a pleasing image.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

As used in this description and the accompanying claims, the following terms shall have the meanings indicated, unless the context otherwise requires:

A "tablet computer" is a mobile computer that is operated by touching a touch screen, such as the iPad computer from Apple Inc. of Cupertino, Calif.

A "board" is a lightweight, rigid or semi-rigid structural member used in the construction of a cover for a tablet computer. A board as herein defined may be made, for example, from paperboard, foam, or other such material or combination of materials.

The terms "exterior" and "interior" refer to the exterior and interior of a cover embodiment of the invention when in a closed configuration.

A proximal-distal axis and a superior-inferior axis are shown in the figures. "Proximal" and "distal" in this connection are meant in reference to the spine, while "superior" and "inferior" are meant in reference to a standard orientation in which the cover is opened in the same manner as a book.

Figure 1:
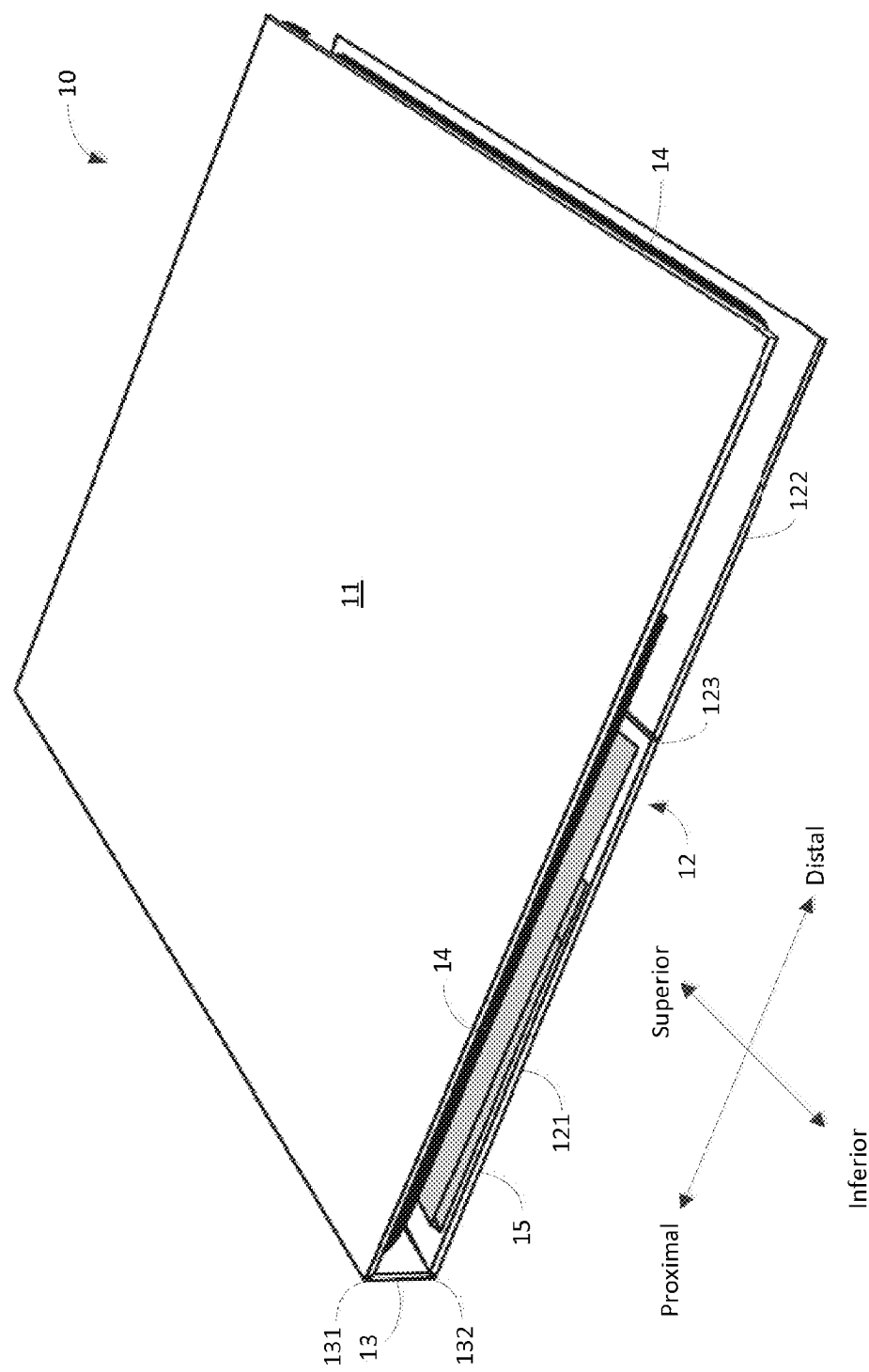
FIG. 1 is a view of a cover embodiment of the invention in a closed configuration.

FIG. 1 is a view of a cover embodiment of the invention in a closed configuration. The shape of the cover 10 is principally defined by three components, namely a front board 11, a back board 12, and a spine board 13. The front board has an exterior surface and an interior surface, as does the back board. The exterior surface of the front board and a portion of the interior surface of the back board are visible in FIG. 1, while the interior surface of the front board and the exterior surface of the back board are not visible. The back board is divided into two sections, a proximal section 121 and a distal section 122. The proximal section and the distal section of the back board each have an interior surface and an exterior surface, and these surfaces correspond to the interior surface and exterior surface of the back board, respectively. The proximal section and the distal section are attached to one another via a hinge 123 that runs along the superior-inferior axis for the entire length of the back board. The spine board 13 is attached to the front board 11 along a front-spine hinge 131 that runs along the superior-inferior axis, and to the proximal section 121 of the back board along a back-spine hinge 132 that also runs along the superior-inferior axis parallel to the front-spine hinge 131 and the back board hinge 123. It can be seen from FIG. 1 that in the closed configuration, the interior surface of the back board faces the interior surface of the front board.

Two additional components reside inside the cover. A cradle assembly 14 and an easel stand 15 are partially visible in FIG. 1. The cradle assembly is designed to releasably grip a tablet computer and hold it within the three-dimensional confines of the closed cover. The easel stand permits the cradle assembly to be inclined at various angles for the comfort of a user viewing the tablet computer screen. These components are described in more detail below.

The hinges may be made from paper, or other inexpensive, lightweight, flexible material. The entire cover 10 itself may be wrapped in a material such as suede, velvet, cloth, or other material that is pleasant to the touch and that conceals the underlying boards and hinges. The exterior surface of the wrapping may be decorated with a pattern, a brand or corporate logo, a pleasing image such as a photograph of a loved one, or other such design. The interior surface of the wrapping may include microfibers to clean the screen of the tablet computer, as shown in FIG. 2.

Figure 2:
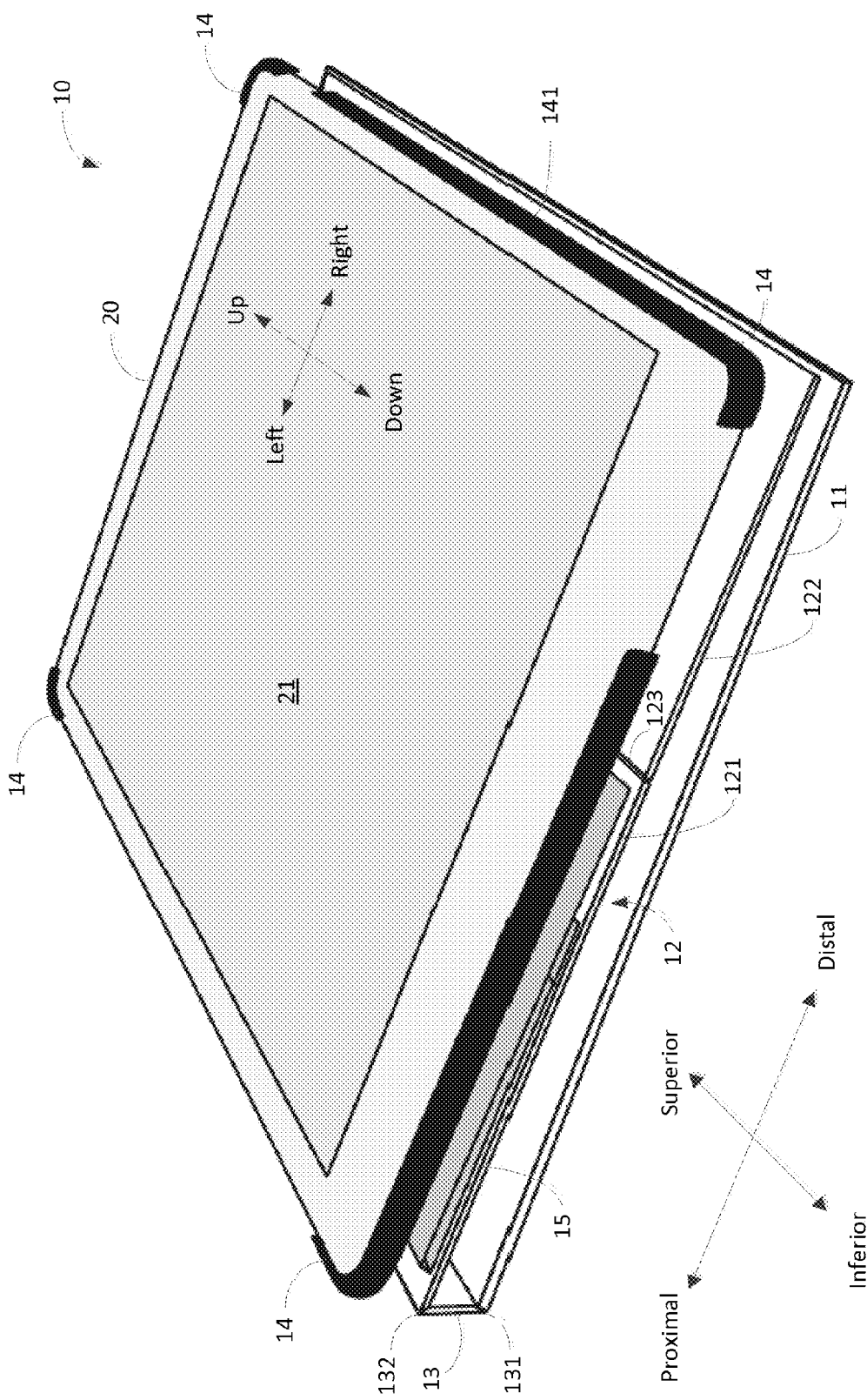
FIG. 2 is a view of the cover in an open, supine configuration.

FIG. 2 is a view of the cover in an open, supine configuration. As can be seen from this view, the front board 11 has been folded around the spine hinges 131, 132 so that in the open configuration it lays underneath the back board 12. In particular, the exterior surface of the back board 12 faces the exterior surface of the front board 11. As described below in connection with FIG. 7, the front board and the back board may be held in place using one or more magnets.

A tablet computer 20 is visible in FIG. 2. The cradle assembly 14 extends on all sides of the tablet computer, and may be made from injection-molded plastic or other such rigid, lightweight, and inexpensive material. Preferably, the cradle assembly is made from a single piece, although it may be made from multiple pieces. The cradle assembly has a front that releasably grips the tablet computer, as shown. The cradle assembly also has a back, a distal portion 141 of which is affixed to the interior surface of the distal section 122 of the back board. The cradle assembly may be affixed to the back board using any common mechanism known in the art, such as by gluing.

The tablet computer 20 includes a touch screen 21. For reference purposes, a secondary set of axes is shown with respect to the touch screen. The up-down axis and left-right axis refer to the orientation of images displayed on the touch screen, which the tablet computer may change as it is rotated in three dimensions. Presuming that the cover was carried like a book, immediately after opening the cover it follows that images will be displayed on the screen in the indicated orientation. Thus, In FIG. 2 the top of the screen will be in the superior direction, the left of the screen will be in the proximal direction toward the spine, and the touch screen will show images in a portrait layout.

Figure 3:
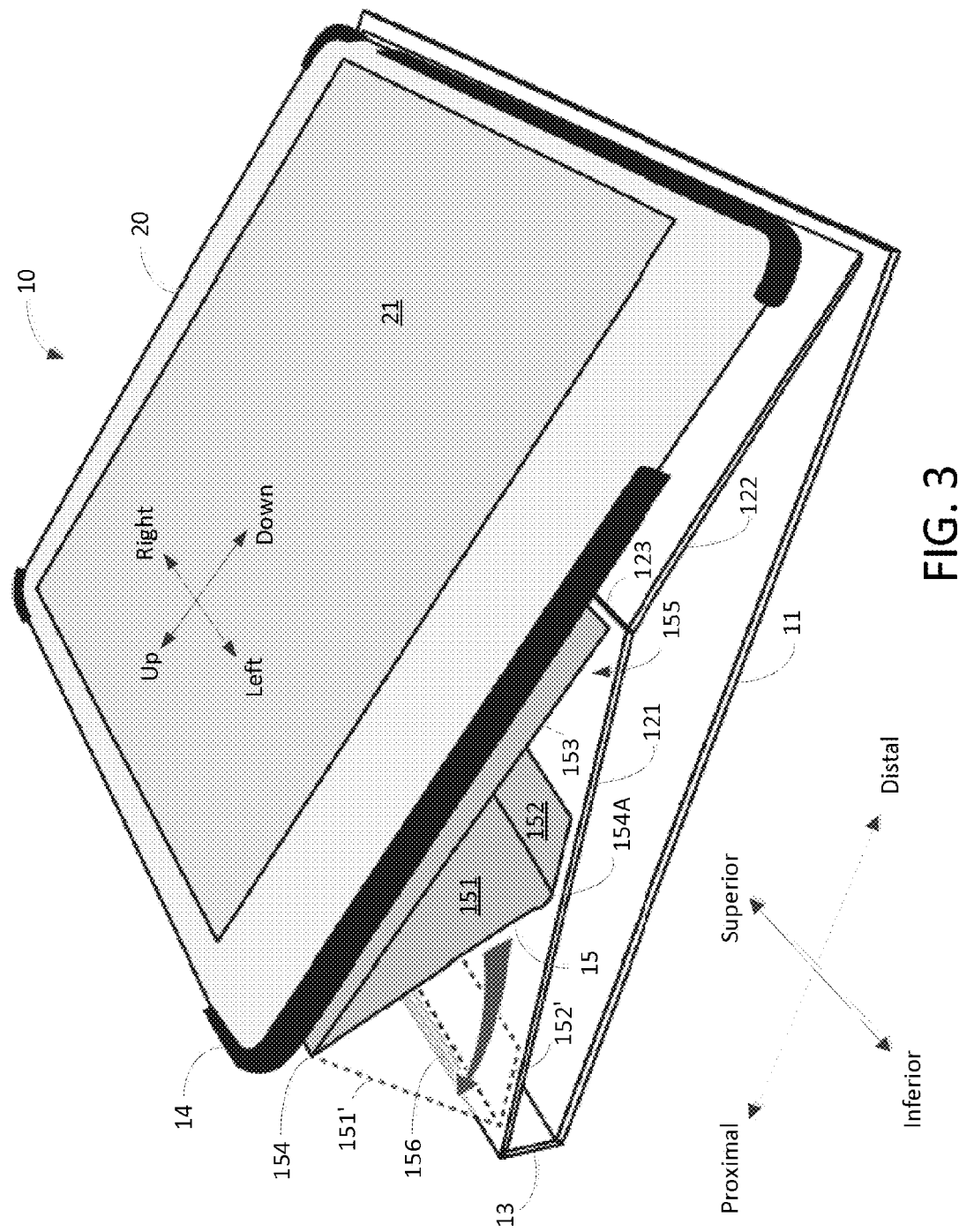
FIG. 3 is a view of the cover during a transition to an open, inclined configuration.

FIG. 3 is a view of the cover during a transition to an open, inclined configuration. Various subcomponents of easel stand 15 may be seen; these include a riser board 151, a movable flap 152, and a fixed flap 153 that is affixed to a proximal portion of the back of the cradle assembly 14. The riser board 151 has a top edge that is attached by a riser-fixed hinge 154 to the fixed flap 153. The riser-fixed hinge axis follows the superior-inferior axis, and is therefore parallel to the back board hinge axis 123. The riser board also has a bottom edge that is moveably attached to the proximal section 121 of the back board. As later described in more detail, the bottom edge may be attached to the proximal section of the back board by a riser-movable hinge 154A to a movable flap 152 in which there is a magnet. However, other attachments may be used, such as a mechanical stopper 156 that uses the weight of the tablet computer 20 to maintain contact between the second edge of the riser board and the proximal section of the back board. Or, one may use a plurality of such mechanical stoppers that are disposed in parallel on the proximal section 121 to provide different angles 155. Similarly, one may use a clasp, a rivet, a sticky substance disposed on either the movable flap 152 or the proximal section 121, or any other attachments known in the art. The fixed flap may be affixed to the proximal section 121 using any common mechanism known in the art, such as by gluing.

Because the cradle assembly 14 is affixed to the back board only on the distal side, the proximal side of the assembly is free to rotate about the axis of the back board hinge 123, thereby creating a positive acute angle 155 between the cradle assembly and the proximal section 121 of the back board. The angle 155 may be varied by rotating the riser board 151 about the riser-hinge axis 154 in the indicated direction, thereby providing different separation distances between the proximal side of the assembly and the proximal section of the back board. The magnitude of the angle 155 is therefore determined by the position of the riser board 151.

Figure 4:
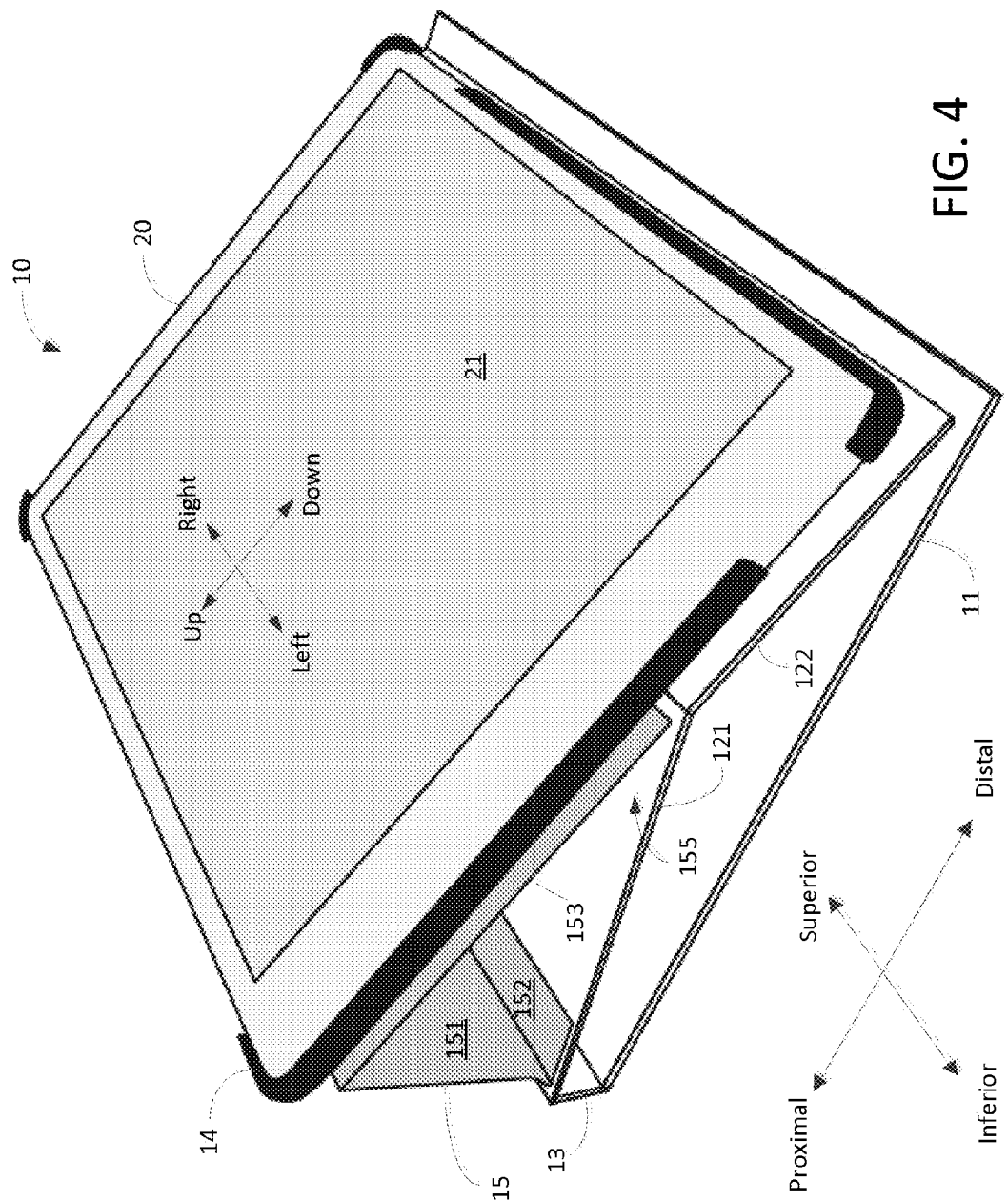
FIG. 4 is a view of the cover in a fully open, inclined configuration.

The riser board 151 and the movable flap 152 may assume any position between laying flat as in FIGS. 1 and 2, and their extremum positions denoted in FIG. 3 by 151' and 152' respectively. In particular, when the bottom edge of the riser board is not attached to the back board, the riser board 151 may be rotated about the riser hinge 154 axis to a position adjacent the back of the cradle assembly 14, thereby permitting the cover to assume the closed configuration of FIG. 1 or the supine configuration of FIG. 2. FIG. 4 shows a view of the cover 10 when the riser board and movable flap are in their extremum positions.

As the cradle assembly 14 is moved from a supine position to an incline position by increasing the angle 155, the touch screen 21 may change its screen orientation. In particular, a gravitational sensor in the tablet computer 20 may indicate that the computer has been turned on its side, so that the "up" direction has changed. Thus, in FIGS. 3 and 4 the secondary axis for the touch screen 21 indicates that the screen's up axis is aligned with the proximal axis, rather than the superior axis as in FIG. 2. The screen images of FIGS. 3 and 4 are displayed in a landscape layout, rather than the portrait layout of FIG. 2.

Figure 5:
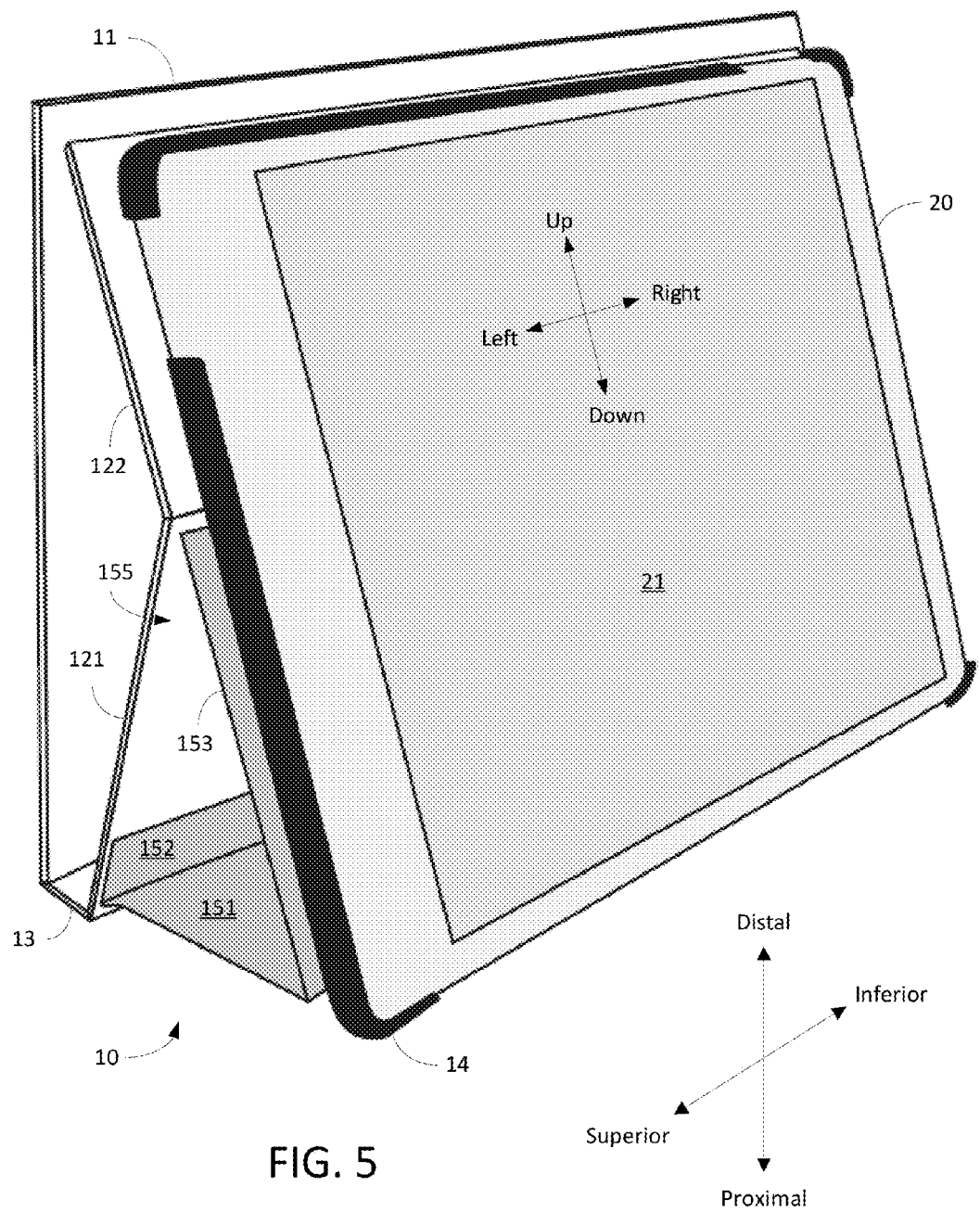
FIG. 5 is a view of the cover of FIG. 4, re-oriented to provide a different screen viewing angle.

FIG. 5 is a view of the cover of FIG. 4, re-oriented to provide a different screen viewing angle to a user. Because the axes have been reoriented, the embodiment shown in FIG. 5 has different structural support characteristics. In FIG. 1, the cover 10 rests upon the exterior surface of the back board 12, while in FIGS. 2-4 the cover rests upon the interior surface of the front board 11. However, in FIG. 5, the cover rests upon the interior surface of the spine 13 and a proximal portion of the cradle assembly 14. The forces throughout the structural members are therefore quite different in FIG. 5 than in the previous figures. For example, by contrast to FIGS. 1-4, in FIG. 5 the proximal section 121 of the back board is the principal load-bearing member in a compression modality. As can be see, the touch screen 21 has once again reoriented the display of images, so that the up axis is aligned with the distal axis.

The design and construction of the cover 10, including the choice of materials that may be used, therefore is governed by considerations that include: the proper ratio of widths between the proximal section 121 and distal section 122 of the back board (which determines the angle 155); the weight of the tablet computer 120; the weight of the cradle assembly 14; the compressive properties and weights of load bearing and non-load bearing components; the width of the spine as compared to the combined thickness of the tablet computer 120 and cradle assembly 14; the strength of the attachment means for attaching the bottom edge of riser board 151 to the proximal section 121 of the back board; and the strength of any attachment means for attaching the front board 11 to the distal section 122 of the back board. The distal section 122 of the back board may have a width that is approximately two-thirds of the width of the proximal section 121 of the back board, and the riser board 151 may have a width up to the width of the proximal section.

Figure 6:
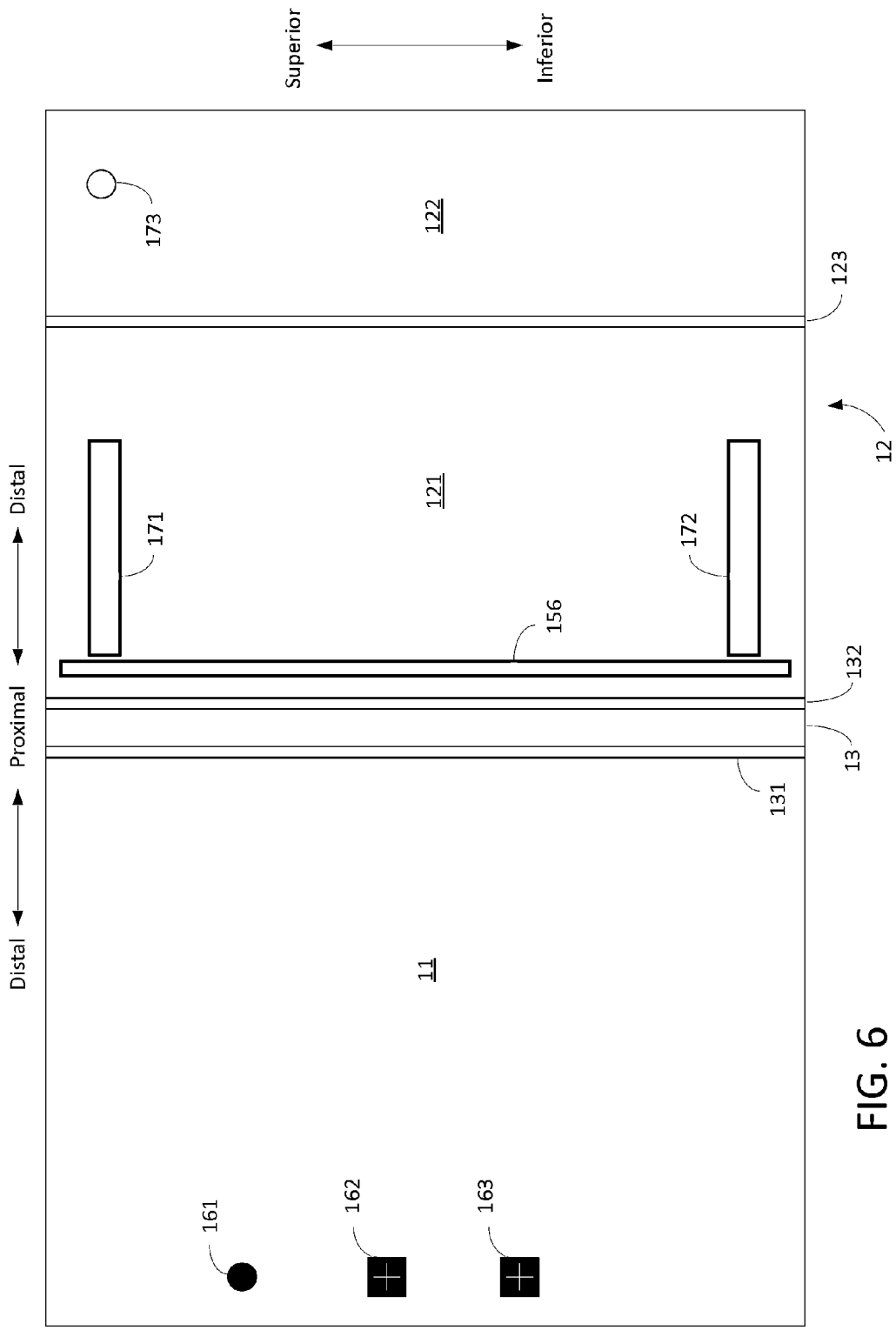
FIG. 6 is a schematic diagram of the interior surfaces of a cover embodiment of the invention.
Figure 7:
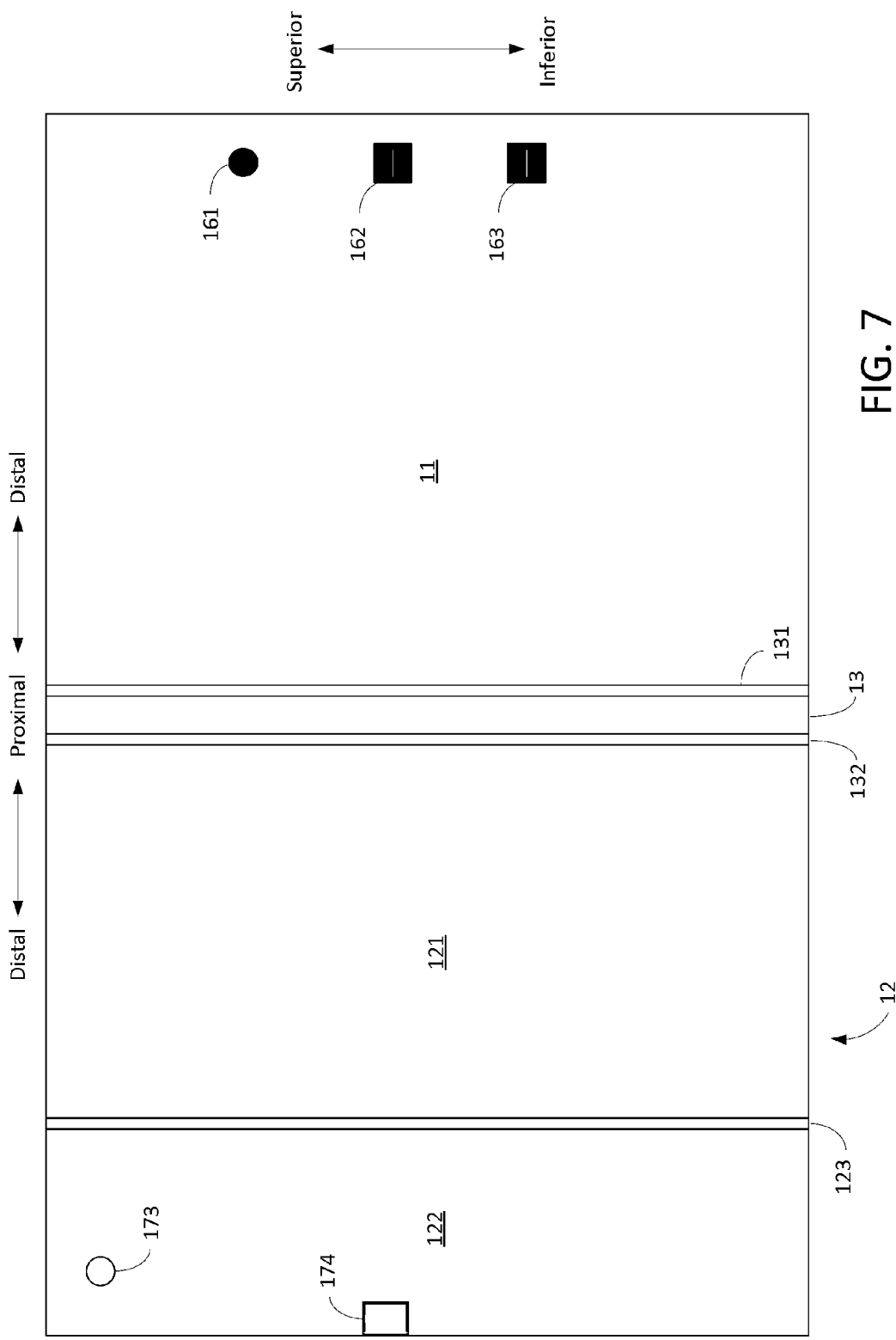
FIG. 7 is a schematic diagram of the exterior surfaces of the embodiment of FIG. 6.
Figure 8:
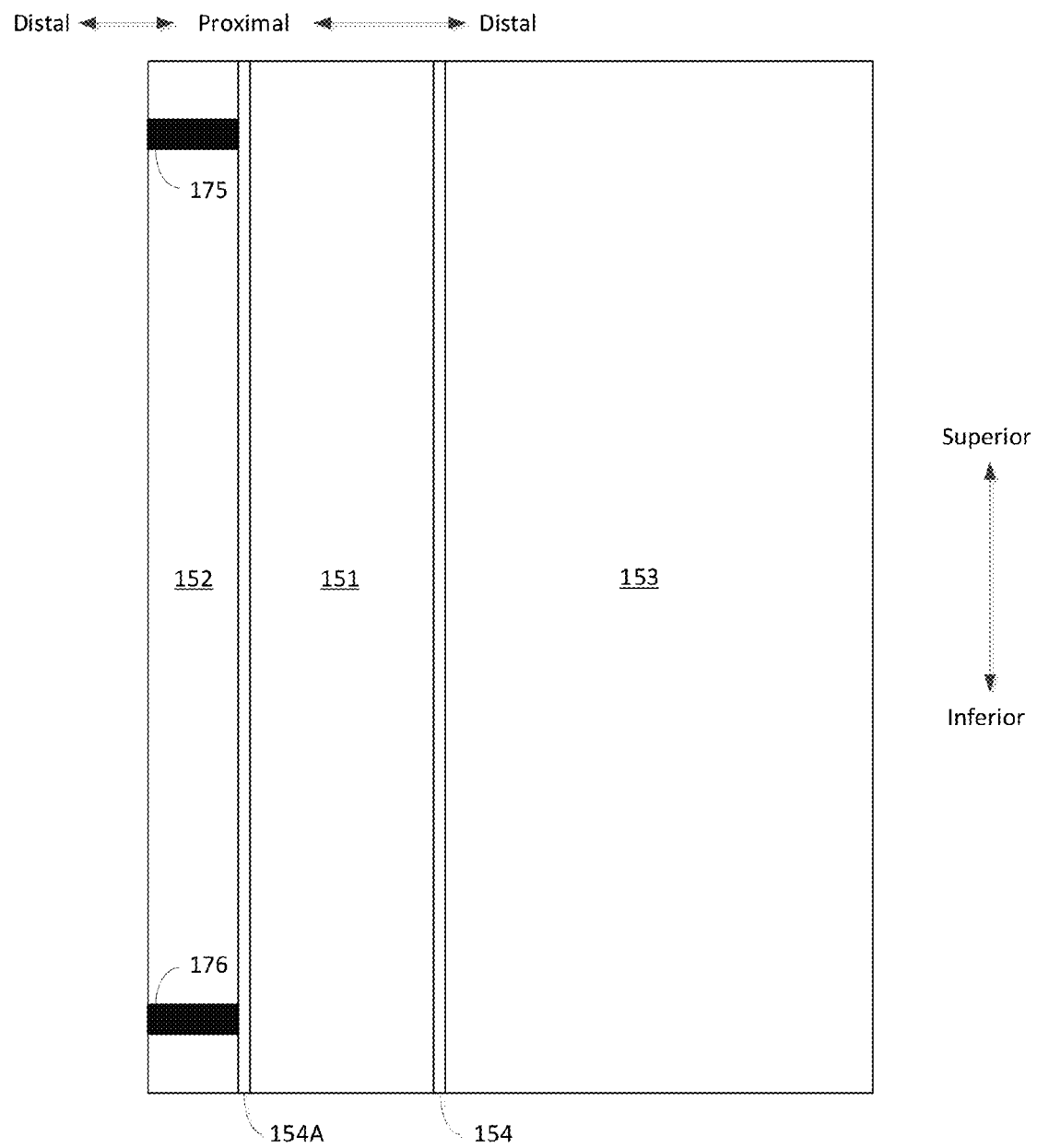
FIG. 8 is a schematic diagram of the easel stand of a cover embodiment.
Figure 9:
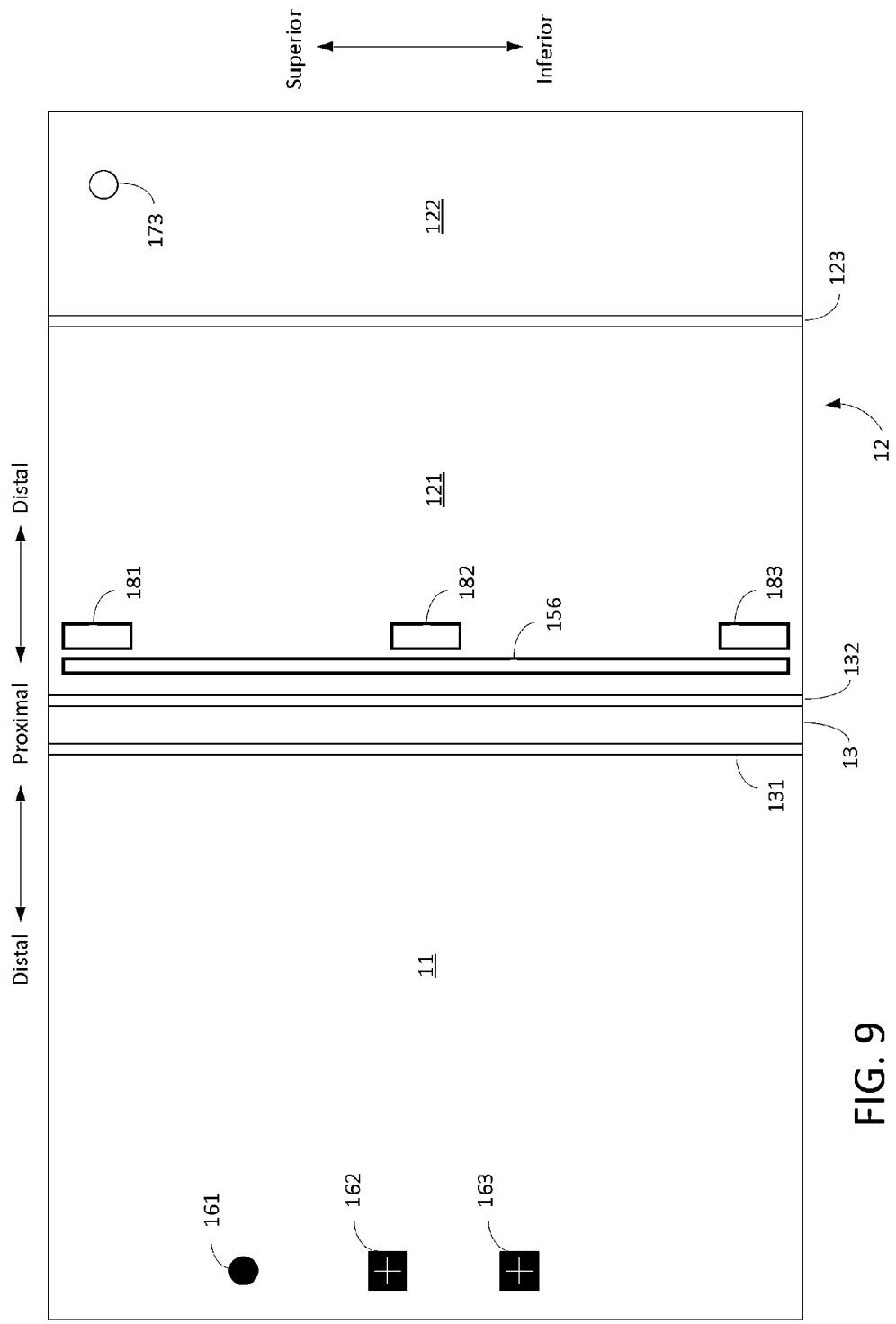
FIG. 9 is a schematic diagram of the interior surfaces of a second cover embodiment of the invention.
Figure 10:
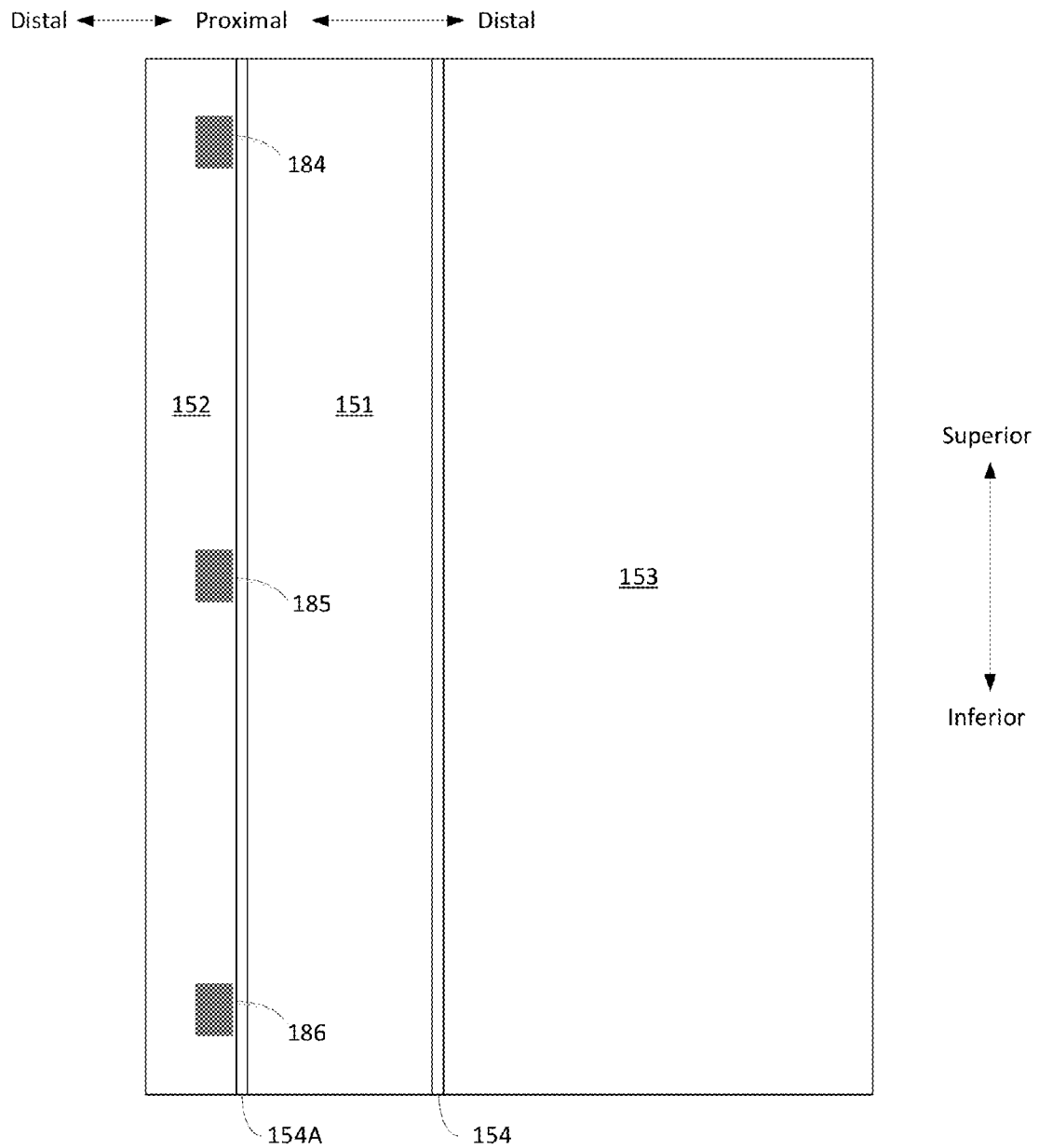
FIG. 10 is a schematic diagram of the easel stand of the embodiment of FIG. 9.

FIGS. 6-8 show schematically the sizes and arrangement of the various components that comprise one embodiment of the cover. FIGS. 9-10 show schematically a second embodiment of the cover. For ease of description, the carrier assembly 14 is omitted. The cover embodiments of FIGS. 6-10 are designed to accommodate an iPad computer, however it will be understood that these designs may be modified by one having ordinary skill in the art to accommodate other tablet computers having different specifications. Precise measurements are given to enable manufacture of a particular embodiment, but do not limit the scope of the invention as defined in the claims.

The interior surfaces of a first cover embodiment are shown in FIG. 6. Components and subcomponents appearing in FIGS. 1-5 are labeled with like characters. There are two proximal-distal axes, one for the front board 11 and one for the back board 12 respectively, with the proximal side being proximate to the spine 13 and the distal side being more distant from the spine in each case. In the embodiments of FIGS. 6-10, the superior-inferior length is 244.786 mm.

The front board 11 is 189.7 mm wide and includes three magnets 161, 162, 163. The first magnet 161 is a round magnet having a diameter of 7 mm and a field strength of 50-100 Gauss with (positive) south pole facing the interior of the cover, whose circumference is located 7.5 mm from the distal edge and 75 mm from the superior edge of the front board. The magnet 161 is positioned in such a way that, when the cover is closed, it interacts with a Hall effect sensor of an enclosed iPad to control whether the iPad is in a sleep or an awake state. Thus, when the cover is transitioned from an open configuration to a closed configuration, the sensor sends a signal to the iPad operating system, putting it into a sleep state. When the cover is opened, so that the magnetic field is no longer in range of the sensor, the sensor sends a signal to the iPad operating system, reverting it back to an operating state. The magnetic field of the first magnet is oriented so that the correct polarity faces the sensor. In this way, when the cover is flipped around as in FIGS. 2-5, the sensor is not affected. The magnet has a low field strength so that it works correctly in both configurations.

A second magnet 162 is a silver, square magnet, 10 mm on a side, positioned 6.5 mm from the distal edge and 28 mm inferior to the first magnet 161. A third magnet 163 is another such magnet, positioned 20.5 mm inferior to the second magnet and 94.286 mm superior to the inferior edge of the front cover. The second and third magnets have strengths of 260-270 Gauss with (positive) south pole facing the interior of the cover. When the cover is closed, the second and third magnets are magnetically coupled to the north poles of two magnets on the interior of the right side of the iPad, as gripped in the cradle assemble in the normal orientation. These additional magnets 162, 163 releasably grip the iPad to prevent the cover from inadvertently opening when closed.

The spine 13 is 11 mm wide. The front-spine hinge 131 and the back-spine hinge 132 are each 3 mm wide.

The back board 12 consists of a proximal section 121 that is 112.82 mm wide, a distal section 122 that is 75 mm wide, and a back board hinge 123 that is 2 mm wide for a total back board width of 189.82 mm. It will be understood that in other embodiments, the widths of the proximal section and the distal section may be altered to provide a greater or lesser angle 155 at maximum extension of the easel stand (as shown in FIGS. 4 and 5), provided that the total width, including the back board hinge, is approximately the same as the width of the front board.

The proximal section 121 of the back board includes a mechanical stopper 156 and two metal tracks 171, 172. The stopper has a width of 5 mm, a length of 235 mm, a height of 2.5 mm, and is evenly spaced 4.893 mm from both the superior and inferior edges of the proximal section and 4 mm from the proximal edge of the proximal section. The stopper acts as a mechanical barrier to arrest the motion of the riser board 151, as described in connection with FIG. 3. The metal tracks 171, 172 are each formed of inexpensive metal, such as steel, that is responsive to magnetic fields. Each track is 70 mm wide, 10 mm in length, and abuts the stopper 156. The first metal track 171 is positioned 15 mm inferior to the superior edge of the proximal section, while the second metal track 172 is positioned 15 mm superior to the inferior edge of the proximal section. These metal tracks work in concert with magnets in the movable flap 152, described in connection with FIG. 8, to provide varying angles 155 between the cradle assembly and the proximal section 121 of the back board.

The distal section 122 includes a hole 173. The hole is 10 mm in diameter, 10 mm from the superior edge of the distal section 122 and 20.647 mm from the distal edge of the distal section. The hole is positioned precisely over the back surface camera of the iPad tablet computer. Alternate cover embodiments that are designed to enclose other tablet computers may move and resize the hole to match the other tablet computer's specifications, or eliminate the hole entirely.

FIG. 7 is a schematic diagram of the exterior surfaces of the embodiment of FIG. 6. The exterior surfaces of the magnets 161, 162, 163 are visible in front board 11, showing the (negative) north poles facing the exterior of the cover. Preferably, these magnets are embedded in the front board so that their poles protrude from both the interior and exterior surfaces. A metal plate 174 is mounted on the exterior surface of distal section 122 of the back board 12. This plate is 10 mm wide, 14 mm in length, abuts the distal edge of the distal section 122 and is 108 mm inferior of the superior edge of the distal section. The plate may be made of an inexpensive metal such as steel. When the cover is open, the exterior face of the front board 11 faces the exterior face of the back board 12. In particular, the magnet 162 is in close proximity to the plate 174, thereby giving rise to a magnetic attraction sufficient to prevent inadvertent relative motion of the front cover with respect to the back cover. In this way, the two covers are locked into place, providing a steady structural support on which the entire assembly may rest. Moreover, when the cover is in the vertical orientation shown in FIG. 5, this magnetic attraction prevents the front board 11 from falling down.

FIG. 8 is a schematic diagram of the easel stand 15 of a particular cover embodiment. As described above, the cover includes a riser board 151, a movable flap 152 attached to the riser board by a riser-movable hinge 154A, and a fixed flap 153 attached to the riser board by a riser-fixed hinge 154. As can be seen in FIGS. 4 and 5, the portion of the easel stand in closest proximity to the spine when the easel stand is extended is the riser-movable hinge 154A, which therefore serves as the center of the proximal-distal axes as indicated. The easel stand is 234.824 mm in the superior-inferior direction.

The riser board 151 is 42.647 mm wide. The movable flap 152 is 20 mm wide. The fixed flap 153 is 99.647 mm wide. The riser-fixed hinge 154 and the riser-movable hinge 154A are each 2 mm wide. The movable flap 152 includes two thin, silver magnets 175, 176 that each have a field strength of 260-270 Gauss. These magnets extend the entire 20 mm width of the movable flap, are 7.5 mm in length, and are positioned 11.357 mm from the superior and inferior edges of the movable flap, respectively. Thus, when the fixed flap 153 is affixed to the center of the back of the cradle assembly 14, the magnets 175, 176 on the movable flap 152 will be in line with the metal tracks 171, 172 on the proximal section 121 of the back board 12. The magnets 175, 176 may be positioned by a user at any point along the length of the metal tracks, thereby permitting a variety of angles 155 to be realized via the hinges 154, 154A when the easel stand is fully or partially extended.

FIG. 9 is a schematic diagram of the interior surfaces of a second cover embodiment of the invention. This embodiment is nearly identical to that of FIG. 6, except that the two metal tracks 171, 172 of the proximal section 121 of the back board 12 have been replaced by three magnets 181, 182, 183 that abut the mechanical stopper 156. These magnets cooperate with three metal plates 184, 185, 186, respectively, on the movable flap 152 of the easel stand 15 shown in FIG. 10 to produce a magnetic attraction. In FIG. 10, the three metal plates replace the two magnets 175, 176 of FIG. 8. As can be seen, the three metal plates abut the riser-movable hinge 154A. Thus, when extending the easel stand 15, one simply slides the riser-movable hinge until it is in contact with the stopper, at which point the three magnets 184, 185, 186 on the movable flap 152 are each in close proximity with a respective metal plate 181, 182, 183 on the proximal section of the back board. The easel stand of this embodiment therefore has only one position at which it is locked into place, namely when it is fully extended as in FIG. 4 or FIG. 5.

Figure 11:
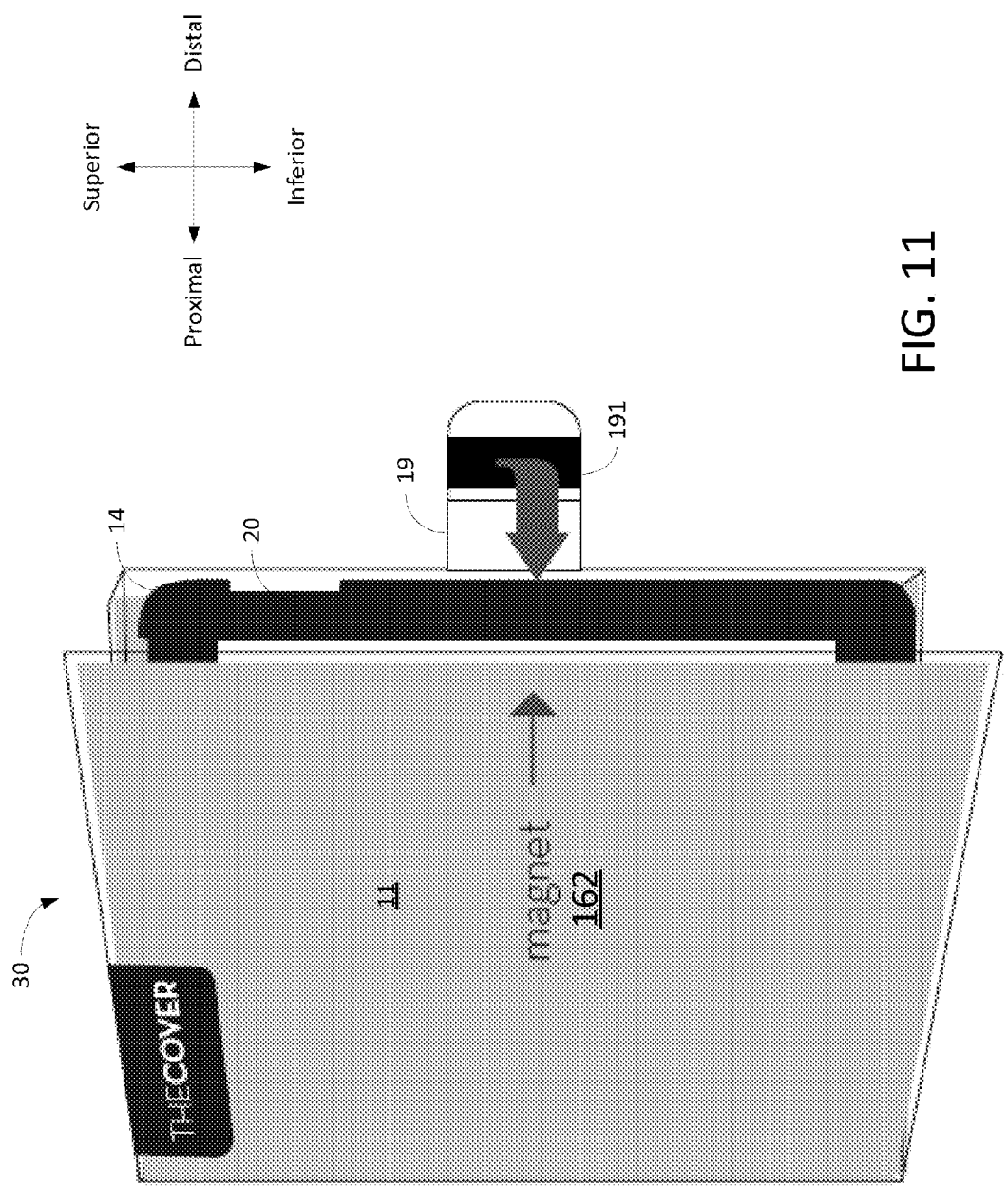
FIGS. 11 and 12 show a packaging that may be used with a cover embodiment of the invention.
Figure 12:
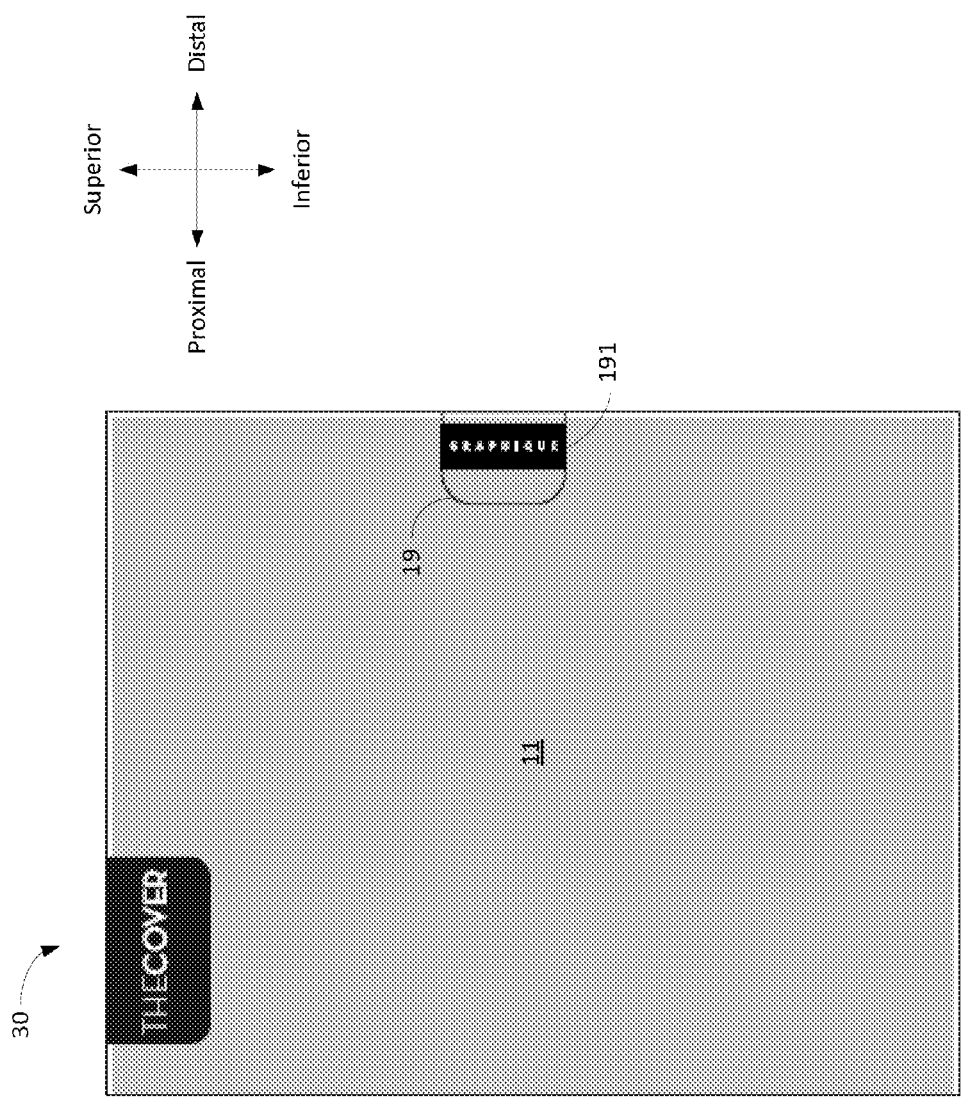

FIGS. 11 and 12 show a packaging 30 that may be used with a cover embodiment of the invention. The packaging may be made of acetate or any other suitable protective material. FIG. 11 shows a partially open packaging surrounding a cover. The cradle assembly 14 of the cover is partially visible, as is a tablet computer 20 that is gripped by the cradle assembly. The front board 11 of the cover is partially open, and has been covered by an outer wrapping to cover the underlying structure. Nevertheless, a magnet 162 is embedded in the front board, as described in connection with FIG. 7. The (negative) north pole of the magnet 162 is directed toward the exterior of the cover.

The packaging includes a flap 19 that is attached to a back surface of the packaging. The flap 19 includes a metallic strip 191. When a cover surrounded by the packaging is closed, as shown in FIG. 12, the flap 19 may be wrapped around the distal side of the cover from the back board to the front board, so that the metallic strip 191 comes into close proximity with the magnet 162. In this way, a magnetic attraction is formed so that the front board 11 releasably grips the metallic strip 191, holding the flap 19 in place. Thus, the packaging 30 is maintained around the cover in a secure, but easily openable manner.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A cover for a tablet computer, the cover comprising:
   a front board having an interior surface and an exterior surface;
   a back board having an interior surface and an exterior surface, wherein the back board includes a proximal section and a distal section, the two sections each having an interior and an exterior surface corresponding to the interior surface and exterior surface of the back board respectively, the two sections being hingedly attached to each other along a back board hinge axis;
   a spine board that is hingedly attached to the front board along a front-spine hinge axis and hingedly attached to the proximal section of the back board along a back-spine hinge axis, the front-spine hinge axis and the back-spine hinge axis being parallel to the back board hinge axis, so that in a closed configuration of the cover, the interior surface of the back board faces the interior surface of the front board, and in an open configuration the exterior surface of the back board faces the exterior surface of the front board;
   a cradle assembly having a front and a back, wherein the front of the cradle assembly is configured to releasably grip the tablet computer and a distal portion of the back of the cradle assembly is affixed to the interior surface of the distal section of the back board;
   a riser board having first and second edges, the first edge of the riser board being hingedly attached to a proximal portion of the back of the cradle assembly along a riser-hinge axis that is parallel to the back board hinge axis; and
   attachment means for removably attaching the second edge of the riser board to the proximal section of the back board, so that
   (i) when the second edge is thus attached, the cradle assembly is maintained at a positive acute angle relative to the proximal section of the back board, and
   (ii) when the second edge is not thus attached, the riser board may be rotated about the riser hinge axis to a position adjacent the back of the cradle assembly, thereby permitting the cover to assume the closed configuration.

2. A cover according to claim 1, wherein the front board, the back board, the spine board, and the riser board comprise paperboard or foam.

3. A cover according to claim 1, wherein each hinge attachment comprises paper.

4. A cover according to claim 1, wherein the cradle assembly comprises injection-molded plastic.

5. A cover according to claim 1, wherein the distal section of the back board has a width that is approximately two-thirds of a width of the proximal section of the back board.

6. A cover according to claim 1, further comprising a stopper attached to the interior surface of the proximal section of the back board near the spine-back hinge axis.

7. A cover according to claim 1, further comprising a metallic track affixed to the interior surface of the proximal section of the back board, and wherein the attachment means comprises a rigid flap hingedly attached to the second edge of the riser board upon which is affixed a magnet, so that when the magnet is aligned with the metallic track, a magnetic attraction is produced that is sufficient to resist relative movement between the rigid flap and the proximal section of the back board.

8. A cover according to claim 7, wherein the positive acute angle of the cradle assembly relative to the proximal section of the back board is adjustable by moving the magnet along the metallic track, so that the angle is decreased by moving the magnet farther from the spine and the angle is increased by moving the magnet closer to the spine.

9. A cover according to claim 7, further comprising a mechanical stop attached to the interior surface of the proximal section of the back board near the spine-back hinge axis, wherein when the second edge of the riser board is in contact with the mechanical stop, the magnet is aligned with the metallic track.

10. A cover according to claim 1, wherein the attachment means comprise a mechanical stopper, a magnet, a clasp, a rivet, or an adhesive.

11. A cover according to claim 1, further comprising a first magnet having a first polarity, that is affixed to the exterior surface of the front board, and a second magnet having a polarity opposite to the first polarity, that is affixed to the exterior surface of the back board, so that when the cover is in the open configuration, the first magnet and the second magnet are aligned to produce a magnetic attraction that is sufficient to resist relative movement between the front board and the back board.

12. A cover according to claim 1, further comprising a magnet that is affixed to the interior surface of the front board, so that when the cover is closed, the magnet aligns with a sensor of the tablet computer, thereby activating the sensor.

13. A cover according to claim 1, further comprising a wrapping that conceals the front board, the back board, and the spine board.

14. A cover according to claim 13, wherein the wrapping comprises cloth.

15. A cover according to claim 14, wherein an exterior surface of the wrapping is decorated with a pattern, a logo, or a pleasing image.

* * * * *